INVENTOR
Robert M. McClure

United States Patent Office 3,165,024
Patented Jan. 12, 1965

3,165,024
SYSTEM FOR GENERATING FACSIMILES OF RADAR SIGNALS
Robert M. McClure, Dallas, Tex., assignor to Texas Instruments Incorporated, Dallas, Tex., a corporation of Delaware
Filed Mar. 22, 1961, Ser. No. 97,678
1 Claim. (Cl. 88—24)

This present invention relates to a continuous recorder system for radar signals and more particularly to a system for continuous recording of radar range and azimuth data on a film.

In general, information from surveillance radar sets is ordinarily displayed through a system wherein the radar return is recorded by photographing the PPI, Plan Position Indicator, on a scan-by-scan basis. However, in recording the radar return or reflected radio pulses on a frame-type recorder, some data is lost because of the intermittent recording technique utilized wherein a time lapse exists from one frame to another. In addition, present recording techniques for radar return have a number of problems, i.e., range switching problems; auxiliary data recording is difficult and cannot be recorded simultaneously and continuously on the same recording medium, such as film; only one video signal can be recorded on the film; and the film cannot be replayed in the same equipment to simulate the original radar signal. Accordingly, present recording systems are not flexible in their use and application, nor adaptable for use with most radar systems, and are fairly complex in structure and in the fabrication thereof, which makes such systems uneconomical to maintain and operate.

The present invention, in its preferred form, comprises a radar recording system for recording range and azimuth information on film, wherein the reflected radar pulses are fed to a cathode-ray tube having a sweep generator to deflect the cathode-ray horizontally. The information or data projected in a horizontal sweep on the screen of the cathode-ray tube is an indication of the range and is recorded on a continuously moving film. The indication of the azimuth is recorded on the moving film in the vertical direction by moving the film in synchronism with the rotation of the antenna, or by suitably recording a signal which records the antenna position and allows for later synchronization of the signal and antenna position when the recording is replayed. In brief, the present invention is a continuous recording system using a CRT sweep to display the video in one dimension, corresponding to range, and a continuous film motion to record the data in the other dimension, corresponding to azimuth.

Further, by eliminating the need for changing frames, all the radar data presented can be recorded. Additionally, the full range of the radar is always recorded with sufficient resolution so that targets are never lost. Facilities are provided to record auxiliary data, such as antenna position and time, which are recorded simultaneously on the same film. The recording can be replayed on the same equipment to re-create radar video signals similar in every way to the original radar return. This presents an exceptional training aid since the playback could be made over conventional PPI consoles.

An object of the present invention is the provision of a recorder system to simulate and record the original video signal.

Another object of the present invention is the provision of a continuous recorder system for radar signals utilizing a photographic system to obtain a continuous recording of the signals without intermittent loss of data.

A further object is to provide a system for continuously recording radar range and azimuth data on film.

Another further object of the present invention is the provision of a technique whereby additional radar channels, such as a beacon channel, can be simultaneously recorded on the same medium.

A still further object of the invention is the provision of an improved method and means for continuously recording on film the reflected signals or target information supplied by a radar system, characterized by economy of operation, adaptability of use, flexibility of location and simplicity of construction.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 4 is a plan view of a portion of the film shown in FIGURE 1.

Figure 1:
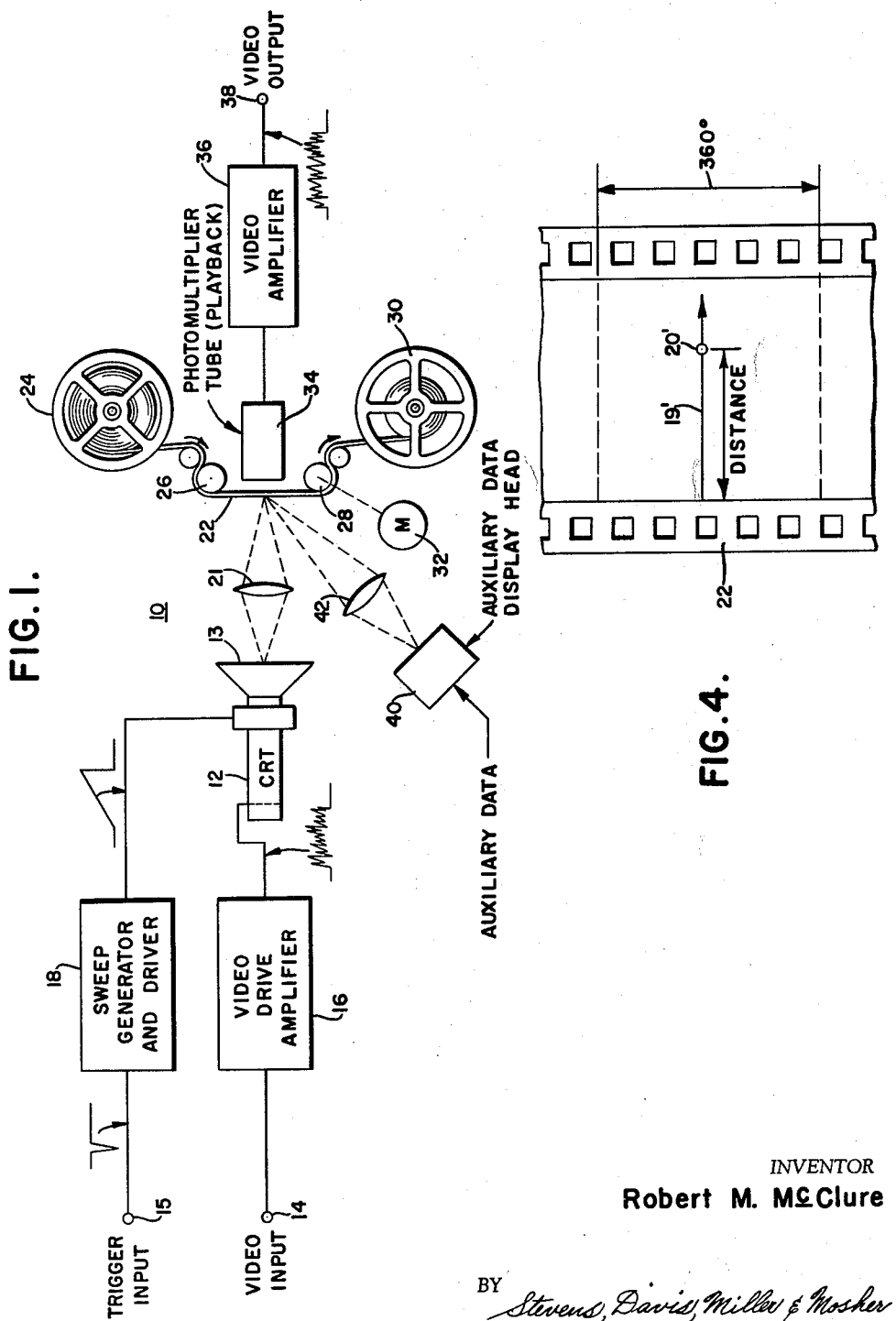
FIGURE 1 is a diagrammatic view of a preferred embodiment of the invention.

Referring now to the drawings, there is illustrated a preferred embodiment of a continuous recorder system 10 for radar signals, wherein transmitted pulses, after reflection from a target, are picked up by a receiver antenna, not shown, and suitably amplified. The receiver output pulses are applied to the control grid of a cathode-ray tube 12 which may be of a conventional design having a phosphorescent screen 13 at one end thereof. The incoming signal applied at a video-input 14 is transmitted to a video drive amplifier 16 where the radar signal is first amplified and then used to modulate the intensity of the electron beam within the CRT 12 to vary the intensity of the display. The cathode-ray is simultaneously swept horizontally by a saw-tooth wave produced by a sweep generator and driver 18 triggered simultaneously with the transmission of the radar pulse. The sawtooth waves are synchronized with the transmitted pulses. In this manner, a one-line repetitive scan triggered by the radar signal is presented on the phosphorescent screen 13, wherein the intensity of the CRT is modulated by the radar video.

The sweep generator and driver 18 is coupled to the horizontal plates associated with the CRT to shift the cathode-ray horizontally. Thus, there is produced on the screen 13 a one-line repetitive scan pattern 19 whereby a bright dot 20 appearing on the screen will indicate the position of a target. The CRT sweep displays the video in one direction horizontally to indicate the range of the target while a continuous film motion upon which the one-line repetitive scan 19 is projected is utilized to display the data in the azimuth dimension. The speed of film movement is such that, by the time the antenna has moved through its resolution angle, the trace on the CRT is exposing a new line on the film. In this way, the data collected by the radar during one revolution will be recorded in a rectangular area on the film, wherein azimuth will be displayed along the length of the film strip, and range across the width of the film strip.

Figure 2:
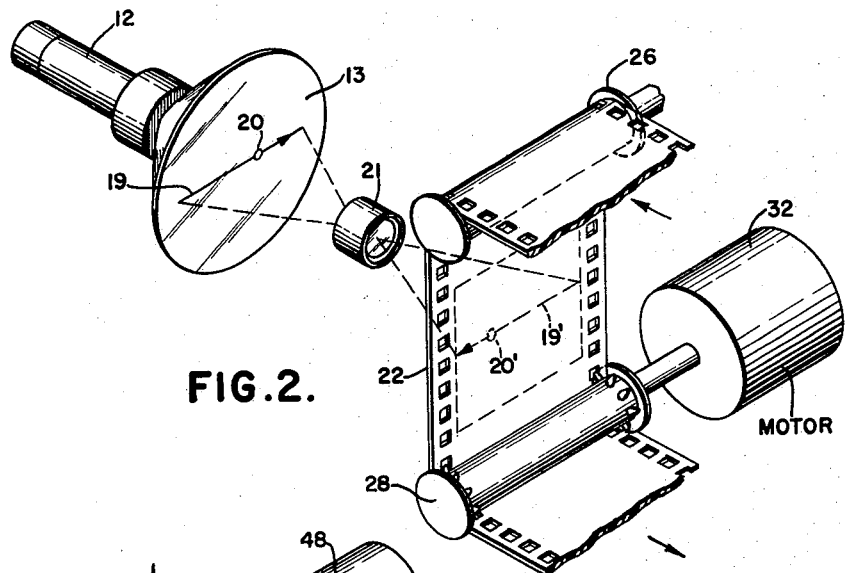
FIGURE 2 is a perspective view of a segment of the device of FIGURE 1.

A conventional converging lens 21 is provided between the CRT and a film 22 to project the one-line repetitive scan 19, FIGURE 2, from the face of the CRT to the continuously moving film as a reproduced scan 19' with a bright dot 20'. The film is fed from a supply magazine 24 through a roller 26 and a sprocket 28 to a used magazine 30. The film sprocket 28 is operatively connected to a film drive motor 32 for driving the film at a predetermined speed. A photomultiplier tube 34 is provided behind the film for the purpose of playback. The photomultiplier 34 may be a blue-sensitive end-fire tube stationed immediately behind the slit in the film gate, not shown. The tube is coupled to a video amplifier 36 and, in turn, fed to a video out lead 38. An auxiliary data display head 40 is provided to project auxiliary data, such as antenna position, time, and the like signals on the film through suitable converging lens 42. To properly position the PPI sweep on playback, it is necessary to record the antenna azimuth that produced a given return. This is accomplished by recording the output of the antenna synchros along the reference track. Usually, these are 60 cps. signals whose phase relationship to each other gives the antenna position. These signals are recorded by applying them to glow modulator tubes, within the head 40, which expose the film, so that the tracks resemble variable-density sound tracks. The film drive is operatively coupled to the antenna position so that each 360° rotation of the antenna signifies a predetermined vertical distance on the film. In this manner, the film is divided into a continuous row of rectangular areas, as shown in FIGURE 4, wherein each frame length proportional to the antenna rotation of 360°. However, since there is no demarcation on the recording to separate one antenna rotation from another, the recording will be continuous of the entire radar range, together with antenna position, information, and time. Also, it is possible by duplicating the CRT and lens or by time sharing the one disclosed CRT, to record a second radar signal, such as a beacon receiver, on the same film.

Figure 3:
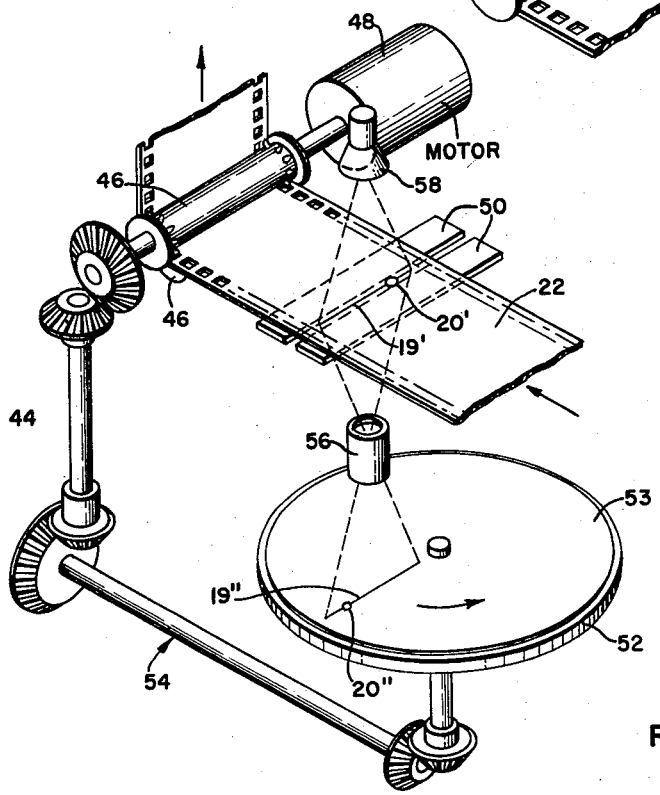
FIGURE 3 is a perspective view of a facsimile apparatus used with the device of FIGURE 1.

After the film is developed, it can be replayed on the same or a similar machine by using the CRT as a flying-spot scanner and picking up the light transmitted through the film with the photomultiplier tube 34. The antenna signals can be used to synchronize the sweep portion of a PPI used for viewing the recorded signal. As shown in FIGURE 3, the recording, which is essentially a continuous "B scope" presentation, can be used to produce simulated PPI photographs by purely optical mechanical means. The replayed decoding can be utilized to re-create radar video signals similar in every way to the original radar return; this can be done at the same, or at a faster, speed. This amounts to an exceptional training aid since the playback can be made over conventional PPI consoles, wherein additional targets can be added by a simulator to give the trainee aircraft to control.

FIGURE 3 shows an optical mechanical means 44 wherein the film 22 is passed through a roller and sprocket arrangement 46 operatively coupled to a film drive motor 48 driving the film over a slit mechanism 50. A turntable 52 is provided geared to the film drive through a suitable gear and linkage arrangement 54. The turntable is provided with unexposed film 53 mounted thereon directly beneath the slit mechanism 50. A suitable lens 56 is provided to project the single-line repetitive scan 19' on the film 22 onto the turntable. A constant light source 58 is utilized to project the developed single-line repetitive scan 19' onto the unexposed film 53 as a reproduced scan 19" with a bright dot 20". The motor 48 moves the film and rotates the turntable in synchronism thereto so that the image is exposed one line at a time on the raw film 53. It will be obvious that several adjacent recordings can be exposed on the same film to build up a composite PPI photograph which contains the returns from several scans.

In the operation of the present invention, radar returns are presented on the screen of the CRT as a single line, which single line is transmitted through the lens 21 to the film 22. The horizontal sweep of the cathode-ray indicates the range and the motion of the film indicates the azimuth location of the target, shown in FIGURE 4. In this manner, the entire radar range, together with antenna position, information, and time is available in a permanent film record. If desired, the recording, which is essentially a continuous "B scope" presentation, can be reproduced to simulate PPI photographs by using the mechanical optical means 44 of FIGURE 3. In the device 44, a film is passed over the slit mechanism 50 with a suitable light source 58 projecting through the film onto a turntable with the unexposed film mounted thereon. The turntable and film are synchronized so that the image is exposed one line at a time on the film. The turntable is geared so that it makes exactly one revolution as the film travels one rectangular area or "frame." If desired, several adjacent frames can be exposed on the same film to build a composite PPI photograph containing the returns from several scans. The resulting composites show traffic patterns clearly and allow the path and velocity of each aircraft to be determined. This feature can be very useful in accident investigations and traffic surveys.

In brief, the present invention presents a method of making radar recordings wherein a continuous recording is possible to eliminate the periodic loss of data which occurs with the frame-type recorder. In addition, no range switching problems exist since the full range of the radar is always recorded with sufficient resolution so that targets are never lost. Further, provision is made for recording auxiliary data, such as antenna position and time signals, simultaneously and continuously on the same film through the auxiliary data display head 40. Also, if necessary or desirable, more than one video signal or beacon signal can be recorded on the same film, and the film can be replayed in the same equipment to simulate the original radar signal.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What is claimed is:

A system for generating facsimiles of radar signals recorded on a developed film as a repetitive single line scan, comprising slit mechanism means, light means operatively associated with said slit means, means for passing the film over said slit means in the path of said light means, a turntable having unexposed film thereon, means synchronizing the rotation of said turntable and movement of the film, and means projecting the signal data on the film onto said unexposed film one line at a time.

References Cited in the file of this patent

UNITED STATES PATENTS

| | | |
|---|---|---|
| 2,616,077 | Holser | Oct. 28, 1952 |
| 2,720,039 | Brown | Oct. 11, 1955 |
| 2,824,271 | Anderson et al. | Feb. 18, 1958 |

FOREIGN PATENTS

| | | |
|---|---|---|
| 781,886 | Great Britain | Aug. 28, 1957 |